Oct. 9, 1956  J. R. WAIT ET AL  2,766,421
METHOD AND APPARATUS FOR GEOPHYSICAL EXPLORATION
Filed Feb. 26, 1952  2 Sheets-Sheet 1
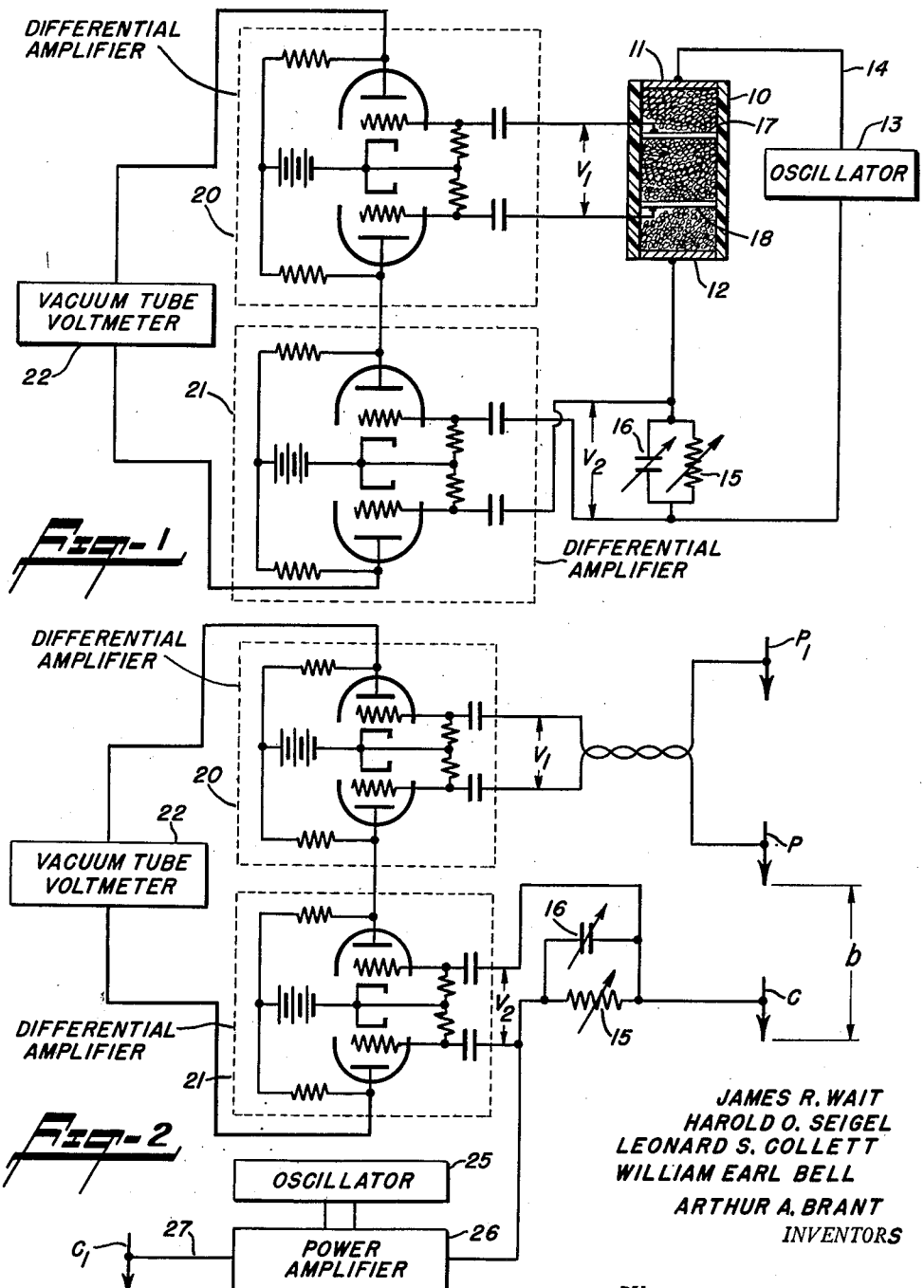
JAMES R. WAIT
HAROLD O. SEIGEL
LEONARD S. COLLETT
WILLIAM EARL BELL
ARTHUR A. BRANT
INVENTORS
BY
*Gaylor, Cifelli & Junick*
ATTORNEYS

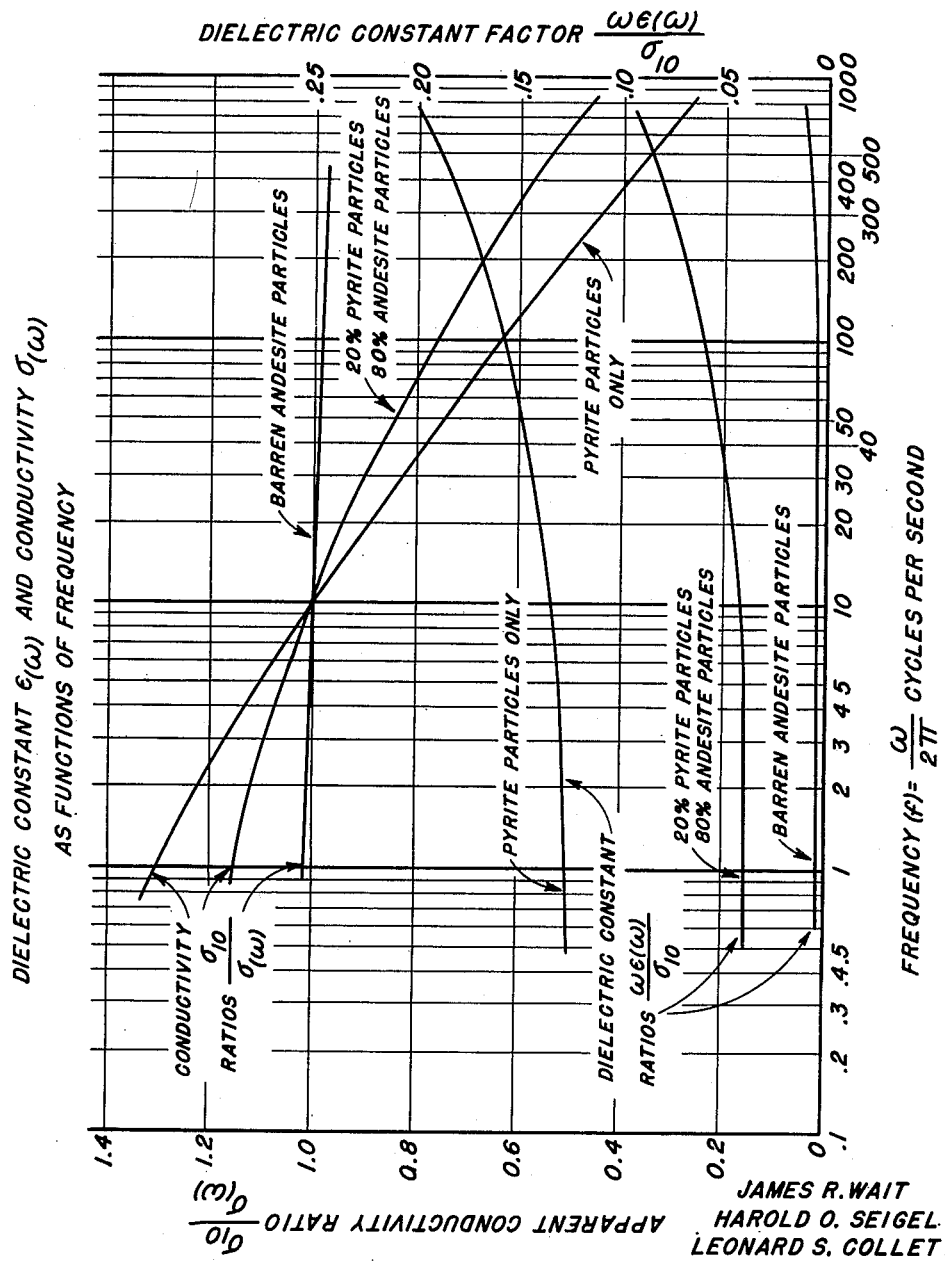

United States Patent Office 2,766,421
Patented Oct. 9, 1956

2,766,421

METHOD AND APPARATUS FOR GEOPHYSICAL EXPLORATION

James R. Wait, Harold O. Seigel, Leonard S. Collett, and William Earl Bell, Jerome, and Arthur A. Brant, Clarkdale, Ariz., assignors to Newmont Mining Corporation, New York, N. Y., a corporation of Delaware Application February 26, 1952, Serial No. 273,422

7 Claims. (Cl. 324—1)

This invention relates to geophysical exploration and more particularly to a novel method for detecting the presence of subsurface metallic particles in an otherwise barren rock.

Metallic particles generally are found in nature in the form of sulphides and it is known that rock formations lying below the water table are fairly well saturated with moisture. Consequently, there may be present, under the ground surface, a medium consisting of a conducting solution of water and soluble metallic salts. These conditions have given rise to various methods for the detection of mineral deposits. Generally, a time-varying current is caused to flow through a selected region of ground and resultant voltages are observed across a pair of pick-up electrodes inserted into the ground surface. The character of these resultant voltages is taken as an indication of the specific subsurface conditions.

It may here be stated that all electrical methods of geophysical exploration are indirect in principle as they involve a critical interpretation of the observed data in order to arrive at a conclusion with respect to the nature of the specific subsurface conditions under investigation. The extent to which interfering and nonrelated phenomena may be excluded or discounted from the observed data, and the extent to which the subsurface mineralization responds to the charging current, establishes the useful scope of the particular process. In these respects our novel method for determining the subsurface presence of metallic sulphides offers a scope of usefulness heretofore not possible.

An object of this invention is the provision of a novel method and apparatus for the detection of scattered metallic sulphides.

An object of this invention is the provision of a method for detecting the presence of subsurface metallic sulphides by ascertaining the apparent dielectric constant and/or electrical conductivity of the underground medium in terms of the frequency of a sinusoidal charging current caused to flow through the medium.

An object of this invention is the provision of a method of geophysical exploration comprising impressing an A.-C. charging current through a selected region of the ground, observing the resulting voltage between a pair of pick-up electrodes inserted into the ground, altering the frequency of the charging current, and establishing the character of the subsurface medium by the variations of the resulting voltages with the frequency of the charging current.

An object of this invention is the provision of a method for determining the presence of mineralization in a medium, said method comprising inserting a pair of charging electrodes into the ground, impressing an A.-C. charging current through said electrodes and through a parallel network comprising a calibrated resistor and capacitor, inserting a pair of spaced pick-up electrodes into the ground at right angles to the charging electrodes, bucking the voltage appearing across said pick-up electrodes against the voltage drop appearing across said parallel network, adjusting the value of the said calibrated resistor and capacitor to balance the voltage across the pick-up electrodes, and sequentially altering the frequency of the changing current and re-establishing the balance between the voltages across the pick-up electrodes and the parallel network, whereby the changes in the values of the calibrated resistor and capacitor with charging current frequency are indicative of the character of the medium.

An object of this invention is the provision of a method of determining the mineralization of a subsurface medium, said method comprising a laboratory determination of the apparent dielectric constant of samples of a known rock medium in an electrolyte solution at different frequencies of a charging current caused to flow through the samples, observing the resulting potential appearing across a pair of pick-up electrodes inserted in the ground in the region to be investigated and within the field of influence of a charging current of known magnitude and frequency, converting the resulting voltage to apparent dielectric constant of the region under investigation, and determining the mineralization of the medium by the relation between the dielectric constant of the investigated region and that of the samples.

These and other objects and advantages will become apparent from the following description when taken with the accompanying drawings. The drawings are for purposes of illustration and are not to be construed as defining the scope or limits of the invention, reference being had for the latter purpose to the appended claims.

In the drawings wherein like reference characters denote like parts in the several views:

Figure 1 is a diagrammatic representation of a laboratory set up for obtaining experimental data;

Figure 2 is a similar representation of apparatus for use in the field; and

Figure 3 is a set of curves illustrating the variation of the apparent dielectric constant and apparent dielectric constant factor of a medium (consisting of rock particles in an electrolyte) as a function of the frequency of a sinusoidal current flowing through the medium.

We have found that the magnitude of the apparent dielectric constant and electrical conductivity of rock materials, within an applied current frequency range of 0.1 to 1000 cycles per second, and the variation of such factors with frequency, is characteristic of the state of mineralization of the material. In particular, the magnitude of the apparent dielectric constant is, for our purposes, directly proportional to the amount of mineralization present. Scattered sulphide mineralization, in its natural form, is always accompanied by an electrolyte solution which is in intimate contact with the sulphide particles. The presence of the sulphide particles will give rise to a high reactive component of induced voltage when an alternating current is caused to flow through the medium. It follows, then that the apparent dielectric constant will be relatively very high when metallic-electrolyte interfaces are present, as compared to barren rock media.

The apparent value of the apparent dielectric constant $\epsilon_{(\omega)}$ and the conductivity $\sigma_{(\omega)}$ are defined in terms of the electrical field E (in volts per metre) by the relationship:

$$J = [\sigma_{(\omega)} + i\omega\epsilon_{(\omega)}]E$$

where J is the density of the applied current in amperes per square meter at a frequency of $$\frac{\omega}{2\pi}$$

Reference is now made to Figure 1 for a description of apparatus and means for establishing the apparent dielectric constant and conductivity of a known mineral-electrolyte medium as a function of the frequency of the current passing therethrough. A cylinder 10, made of a suitable insulating material, is provided with metallic end plates 11, 12 closing each end thereof. The cylinder is filled with a medium comprising pyrite particles, varying in diameter from 0.84 to 2.0 millimeters, and a 0.01 percent normal solution of NaCl, said solution comprising approximately 5 percent of the total contained volume. The alternating current source comprises an oscillator 13 adjustable in frequency from 0.1 to 1000 cycles per second and capable of delivering a current of several amperes. One side of the oscillator is connected directly to the metal plate 11 by the wire 14 and the other side is connected to the metal plate 12 through a parallel network comprising a calibrated resistor 15 and a calibrated capacitor 16. In such arrangement, a uniform current is caused to flow through the sample medium, said current having a density $$J = \frac{I}{A}$$

where I is the current in amperes and A is the surface area of the metal plate in square meters. Centrally spaced between the end plates 11 and 12 are two conducting rings 17, 18, made of thin copper and having axes coinciding with that of the cylinder. For a current I, flowing through the sample, the voltage between the two rings 17, 18 is designated as $V_1$, such voltage being out of phase with the applied current. The voltage appearing across the resistor 15 and capacitor 16 is designated $V_2$. For any given frequency, $$\frac{\omega}{2\pi}$$

and any constant current, the voltages $V_1$ and $V_2$ can be made exactly equal in magnitude and phase by proper adjustment of the resistor 15 and capacitor 16. To establish an exact balance between these two voltages we employ a null method as will now be described.

The null measurement preferably is accomplished by employing two, identical, differential amplifiers 20, 21, of standard design, which convert the input voltages $V_1$ and $V_2$ to a magnitude and form where they may be compared directly by a null indicating device such as the vacuum tube voltmeter 22. When the voltages $V_1$ and $V_2$ are balanced, the apparent dielectric constant (and the apparent conductivity) of the test sample are related as follows:

$$\frac{V_1}{I} = \frac{V_2}{I} = \frac{a}{(\sigma + i\omega\epsilon)A} = \frac{1}{G + i\omega C}$$

where: $a$ is the distance between the two rings 17 and 18, in meters, G is the value of the resistor 15 in mhos for a particular current frequency, C is the capacity of the capacitor 16 in farads for the same current frequency.

The dielectric constant $\epsilon$ and conductivity $\sigma$ are given by the relationship:

$$\epsilon = a\frac{C}{A}$$

$$\sigma = a\frac{G}{A}$$

A being the area of the plate 11 in square meters.

With the above-described apparatus a function proportional to the reciprocal of conductivity $$\frac{\sigma_{10}}{\sigma(\omega)}$$

and a function proportional to the apparent dielectric constant $$\frac{\omega\epsilon(\omega)}{\sigma_{10}}$$

were plotted as shown in the curves of Figure 3, the conductivity $\sigma(\omega)$ at a frequency of 10 cycles per second being taken as a convenient reference. The curves of Figure 3 show the stated function variations, in terms of frequency variation, for three samples separately placed into the test cylinder, namely, 1. Particles of pyrite only,
2. 20% by volume pyrite particles plus 80% andesite particles,
3. Particles of andesite only.

In each of the above tests 5% of the total volume within the cylinder comprised a 0.01% normal solution of NaCl.

From the curves it is quite evident that the apparent dielectric constant of the pyrite particles is very large and decreases as the relative volume ratio of pyrite particles to andesite particles is decreased. Also, the conductivity is, in general, an increasing function with frequency. This change with frequency is less pronounced as the pyrite content is decreased. The departure of the ratio $$\frac{\omega\epsilon(\omega)}{\sigma_{10}}$$

from a constant value, has been found to be characteristic of mineralization whereupon it follows that a measurement of $$\frac{\omega\epsilon(\omega)}{\sigma_{10}}$$

for various frequencies, presents a means of recognizing the presence of mineralization in a subsurface medium.

For a given behavior at an interface between the sulphide particle surface and the surrounding electrolyte, the composite behaviour of the medium loaded with distributed particles of a specified volume ratio and particle diameter can be predicted.

The capacitive and resistive layer that exists at the sulphide-electrolyte interface is best described for analytical purposes as a complex admittance per unit area and designated as $g$ in units of mhos per square meter and is in general a function of frequency. That is, for a normal current density J amps. per square meter flowing across the interface, the resulting voltage drop $v$ in volts across the interface is given by $$v = \frac{J}{g} \quad (1)$$

We now consider a region loaded with a volume ratio $q$ of metal sulphide particles whose conductivity, $\sigma_1$, is much higher than the conductivity $\sigma_2$ of the surrounding matrix medium composed of the electrolyte and the host rock. The equivalent conductivity $\sigma(\omega)$ and the equivalent apparent dielectric constant $\epsilon(\omega)$ as functions of frequency, of the composite region (including the effect of sulphide particles) can be shown to be given by:

$$\sigma + i\omega\epsilon = \sigma_2\left(\frac{1 + 2qX}{1 - qX}\right) \quad (2)$$

where $$X = \frac{1 - \frac{\sigma_2}{ga}}{1 + \frac{2\sigma_2}{ga}} \quad (3)$$

and $\sigma$, $\epsilon$ and $g$ are all functions of the frequency $\omega$.

To a good first approximation the first term in the binominal expansion of the denominator of Equation 2 is only required, then $$\sigma + i\omega\epsilon \approx \sigma_2(1 + 3qX) \quad (4)$$

since $q$ is usually much less than one. Now $g$ has a conductive (real) part $g_1$ and a reactive (imaginary) part $g_2$ and it can be written $$g = g_1 + ig_2$$

The quantities $\sigma$ and $\epsilon$ are thus defined in terms of $g_1$ and $g_2$ by the above equations, where again $\sigma$, $\epsilon$, $g_1$ and $g_2$ are functions of frequency.

In general $\epsilon$ will be larger for smaller particles of a specific material for a specific volume ratio. For a specified particle size, ε will vary directly as the particle volume ratio.

Reference is now made to Figure 2 for a description of apparatus designed primarily to measure the apparent dielectric constant, as a function of frequency, of barren rock with scattered mineralization. A four electrode system is employed namely, the charging electrodes C, C₁ and the pick-up electrodes P, P₁. The charging current is furnished by an oscillator 25 capable of supplying a sinusoidally-varying current, I, selectively variable from 0.1 to 1000 cycles per second. The oscillator output is amplified by a conventional, direct-coupled power amplifier 26 and the amplifier output is fed directly to the one charging electrode C₁ over the cable 27 and to the other charging electrode C through the parallel network comprising the calibrated resistor 15 (having a conductance G, in mhos) and a calibrated capacitor 16 (having a capacity C in farads). The charging current (I in amperes) flows through such parallel network to develop a voltage drop V₂ thereacross. Such voltage drop, V₂ is amplified by the differential amplifier 21.

When the sinusoidal charging current flows through the ground, the resulting voltages appearing on the surface of the earth are measured by the pick-up electrodes P₁ and P which are inserted into the ground along a line which passes through the charging electrode C. The specific configuration of the electrodes P, P₁, and C is immaterial to the practice of the invention although in the field it is generally desirable to arrange such electrodes on a line that is normal to the line of the charging electrodes C, C₁. In such arrangement the inductive coupling between the charging line and the pick-up line is negligible. It is here pointed out that the relative configuration of the electrodes is immaterial since a voltage and phase balance is obtained between the pick-up electrodes P, P₁ and the reference impedance 15, 16 and any ratio involving $$\frac{\epsilon}{\sigma}$$

is independent of the distance between the potential electrodes 17 and 18, see Figure 1. Since, in any case, the charging electrode, effectively, is infinitely far removed from the other electrodes the set-up essentially is a single point electrode arrangement. The resulting voltages, V₁, appearing across the pick-up electrodes, are amplified by the differential amplifier 20. The output voltages of the two differential amplifiers are in series opposition and the voltage difference is measured by a suitable vacuum tube voltmeter 22. For a specific electrode configuration and charging current frequency, the actual values of the resistor 15 and capacitor 16 are adjusted until the indication on the meter 22 is absolutely zero. If the linear distance, in meters, between the nearest electrodes of the different pairs (charging electrode C and the pick-up electrode P) be designated as $b$, then the electrode configuration may be so arranged that the linear distances between electrodes C, P₁ and C₁, P₁ and C₁, P, are all greater than $10b$. The electrodes C₁ and P₁ are then effectively at infinity and we have a so-called two (2) electrode array involving only the electrodes C and P. If the electrode P₁ is close to P and co-linear with the electrodes C and P we have, effectively, a single current gradient array.

The apparent dielectric constant (and the apparent conductivity) of the subsurface medium, at a specified charging current frequency, can be determined from the readings of C and G of the capacitor 16 and resistor 15, respectively. The voltage V₁, developed across the pick-up electrodes, for a charging current I is given by the formula:

$$\frac{V_1}{I} = \frac{1}{2\pi(\sigma + i\omega\epsilon)b}$$

for all sinusoidal charging current frequencies within the range of 0.1 to 25 cycles per second. The conductivity σ and the apparent dielectric constant ε are, again, functions of frequency and the above equation defines the apparent dielectric constant and apparent conductivity for a homogeneous, flat earth at a specified operating frequency. When the indicating device 22 indicates a null, the following equation is evident:

$$\frac{V_2}{I} = \frac{V_1}{I} = \frac{1}{2\pi(\sigma + i\omega\epsilon)b} = \frac{1}{G + i\omega C}$$

therefore, the apparent dielectric constant $$\epsilon(\omega) = \frac{C}{2\pi b}$$

the apparent conductivity $$\sigma(\omega) = \frac{G}{2\pi b}$$

If the functions ε and σ are plotted against the logarithm of the angular frequency of the charging current, a set of curves similar to those in Figure 3 will be obtained, depending upon the state of mineralization of the subsurface medium falling within the range of the pick-up electrodes. For a medium devoid of sulphides the $$\frac{\omega\epsilon(\omega)}{\sigma_{10}}$$

curve will be a substantially flat, straight line of small or negligible magnitude. For a medium containing sulphides, $$\frac{\omega\epsilon(\omega)}{\sigma_{10}}$$

will have a value comparable to 10–30 times the magnitude of the value for barren rock and such function will increase noticeably with increase in the charging current frequency. Although our primary aim is to measure the apparent dielectric constant and the factor $$\frac{\omega\epsilon(\omega)}{\sigma_{10}}$$

it is pointed out that the curves $$\frac{\sigma_{10}}{\sigma(\omega)}$$

of Figure 3, also have diagnostic value, a straight line slope indicating barren material and curved lines of considerable slope indicating the presence of scattered sulphides in the subsurface medium.

So far as we know it is broadly new to determine the mineralization of a subsurface medium by observing the variations, with frequency, of the apparent dielectric constant of the medium. Certain changes and variations in the apparatus and/or the specifically described method of exploration will occur to those skilled in this art and it will be understood such changes and modification may be made without departing from the spirit and scope of our invention as set forth in the following claims.

We claim:

1. A method of determining the mineralization of a subsurface medium said method comprising inserting a pair of spaced charging electrodes into the ground, impressing a sinusoidal charging current of known magnitude and frequency through said charging electrodes and through a parallel network that is connected in series with the charging electrodes, said network consisting of a calibrated variable resistor connected in parallel with a calibrated variable capacitor, inserting a pair of pick-up electrodes into the ground in the field of influence of the charging current and along a line perpendicular to that of the charging electrodes, applying the voltage appearing across said parallel network to a first differential amplifier, applying the voltage appearing across said pick-up electrodes to a second differential amplifier, bucking the voltage outputs of the two differential amplifiers, adjusting the values of the said calibrated resistor and capacitor to establish an exact balance between the amplifier outputs, changing the frequency of the charging current, the mineralization of the medium being determined by the variation in the values of the calibrated resistor and capacitor necessary to re-establish a balance between the amplifier outputs.

2. A method of determining the mineralization of a subsurface medium said method comprising placing a sample of a known rock and mineral particles and known percentage of electrolyte solution into a chamber of known volume, impressing an A.-C. charging current flow of known density through the sample and through a parallel network that is connected in series with the sample, said network consisting of a calibrated variable resistor connected in parallel with a calibrated variable capacitor, determining the dielectric constant of the sample in terms of the actual values of the calibrated resistor and capacitor for discrete changes in the charging current frequency over a range of 0.1 to 1000 cycles per second, similarly establishing the dielectric constants of different samples of known rock particles placed into the chamber, inserting the said calibrated resistor and capacitor in series with a source of sinusoidal current and a pair of spaced charging electrodes inserted into the ground, adjusting the flow of charging current between said charging electrodes to a known magnitude and frequency, inserting a pair of spaced pick-up electrodes into the ground within the field of influence of the charging current, bucking the voltage appearing across the pick-up electrodes against that appearing across the said calibrated resistor and capacitor, adjusting the values of the resistor and capacitor to establish an exact balance between such bucking voltages, and altering the frequency of the said source, and readjusting the values of the resistor and capacitor to establish an exact balance between the bucking voltages for each such discrete change in current frequency, the mineralization of the medium being determined by the actual values of the calibrated resistor and capacitor as related to similar such values obtained in testing the samples.

3. Apparatus for use in geophysical exploration and comprising a source of sinusoidal current, a pair of spaced charging electrodes inserted into the ground and connected to said source through a parallel network consisting of a calibrated variable resistor and a calibrated variable condenser, selectively-operable means for varying the frequency of said source in discrete steps, a pair of spaced pick-up electrodes inserted into the ground within the field of influence of the current flowing through the charging electrodes, a first differential amplifier having an input connected across said calibrated resistor and condenser, a second differential amplifier having an input connected across said pick-up electrodes, and an electrical indicator connected in the output circuits of both amplifiers.

4. The invention as recited in claim 3, wherein the said pick-up electrodes are disposed along a line that runs through one charging electrode substantially normal to the line of the charging electrodes.

5. The invention as recited in claim 4, wherein the voltage inputs to the two differential amplifiers are of opposed phase.

6. A method of detecting the existence of scattered mineralization in a selected region of ground which method comprises inserting a pair of spaced pick-up electrodes into the ground; impressing a charging current of known magnitude and frequency through the charging electrodes and through a network connected in series with one of the charging electrodes, said network consisting of a variable calibrated resistor connected in parallel with a variable calibrated condenser and the frequency of the charging current falling in the range of 0.1–1,000 cycles per second; inserting a pair of spaced pick-up electrodes into the ground within the field of influence of the charging current; bucking the voltage drop across the pick-up electrodes against the voltage drop across the said network; and balancing the two voltage drops to equality in magnitude and phase by adjusting the values of the said resistor and condenser, the factor $$\frac{G_{(\omega)}}{G_{(x)}}$$

being taken as indicative of the presence of mineralization, where:

$G_{(\omega)}$ = the value of the resistor in mhos at the charging current frequency, and $G_{(x)}$ = the value of the resistor in mhos at a reference frequency other than that of the charging current.

7. A method of detecting the existence of scattered mineralization in a selected region of ground which method comprises inserting a pair of spaced charging electrodes into the ground; impressing a charging current of known magnitude and frequency through the charging electrodes and through a network connected in series with one of the charging electrodes, said network consisting of a variable calibrated resistor connected in parallel with a variable calibrated condenser and the frequency of the charging current falling in the range of 0.1–1,000 cycles per second; inserting a pair of spaced pick-up electrodes into the ground within the field of influence of the charging current; bucking the voltage drop across the pick-up electrodes against the voltage drop across the said network; and balancing the two voltage drops to equality in magnitude and phase by adjusting the values of the said resistor and condenser, the factor $$\frac{C_{(\omega)}x\omega}{G_{(x)}}$$

being taken as indicative of the presence of mineralization, where:

$C_{(\omega)}$ = the value of the condenser in farads, $\omega = 2\pi f$ $f$ = the frequency of the charging current in cycles per second, and $G_{(x)}$ = the value of the resistor in mhos at a reference frequency other than that of the charging current.

References Cited in the file of this patent

UNITED STATES PATENTS

| 2,293,024 | Klipsch | Aug. 11, 1942 |
| 2,592,101 | Aiken | Apr. 8, 1952 |